(12) United States Patent
Mosten et al.

(10) Patent No.: US 11,353,085 B2
(45) Date of Patent: Jun. 7, 2022

(54) CANTILEVER ASSEMBLIES AND METHODS OF PROVIDING DAMPING FOR CANTILEVER ASSEMBLIES

(71) Applicant: The Boeing Company, Chicago, IL (US)

(72) Inventors: Randall L. Mosten, Chicago, IL (US); Brian Montague, Chicago, IL (US); Michael Klein, Chicago, IL (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 16/459,209

(22) Filed: Jul. 1, 2019

(65) Prior Publication Data

US 2021/0003192 A1    Jan. 7, 2021

(51) Int. Cl.
*F16F 15/03* (2006.01)
*F16F 7/104* (2006.01)
*F16F 15/02* (2006.01)
*F16F 7/10* (2006.01)

(52) U.S. Cl.
CPC ............ *F16F 15/035* (2013.01); *F16F 7/104* (2013.01); *F16F 7/1011* (2013.01); *F16F 15/022* (2013.01); *F16F 2222/06* (2013.01); *F16F 2224/0283* (2013.01); *F16F 2230/08* (2013.01)

(58) Field of Classification Search
CPC ...... F16F 15/035; F16F 15/022; F16F 7/1011; F16F 7/104; F16F 2222/06; F16F 2224/0283; F16F 2230/08
See application file for complete search history.

(56) References Cited

U.S. PATENT DOCUMENTS

| | | | |
|---|---|---|---|
| 4,597,070 A * | 6/1986 | Redeker | G01V 1/181 310/15 |
| 4,928,263 A | 5/1990 | Armstrong et al. | |
| 9,016,129 B2 | 4/2015 | McConnell et al. | |
| 9,291,727 B2 * | 3/2016 | Eick | G01V 1/201 |
| 9,388,875 B2 | 7/2016 | Hagelin et al. | |

* cited by examiner

*Primary Examiner* — Xuan Lan Nguyen
(74) *Attorney, Agent, or Firm* — McDonnell Boehnen Hulbert & Berghoff LLP

(57) ABSTRACT

An example cantilever assembly includes a cantilever including an anchor configured to be coupled to a support, a tip, and an arm positioned between the anchor and the tip, a hollow conductive tube positioned at the tip of the cantilever, and a magnet suspended inside the hollow conductive tube with a first spring and a second spring. The first spring and the second spring are positioned at a first end and a second end of the hollow conductive tube respectively, and the magnet is positioned between the first spring and the second spring. The magnet is configured to move coaxially inside the hollow conductive tube as permitted by the first spring and the second spring, and the magnet suspended inside the hollow conductive tube operates as a tuned mass damper (TMD) to limit a resonant response of the cantilever assembly.

20 Claims, 4 Drawing Sheets

CANTILEVER ASSEMBLIES AND METHODS OF PROVIDING DAMPING FOR CANTILEVER ASSEMBLIES

FIELD

The present disclosure generally relates to tuned mass damping for assemblies, and more particularly to, cantilever assemblies and methods of providing damping for cantilever assemblies for acoustic sensors.

BACKGROUND

In mechanical systems, resonance occurs when a frequency at which a force is periodically applied is equal to one of the natural frequencies of the system on which it acts. This causes the system to oscillate with larger amplitude than when the force is applied at other frequencies. In some systems, it is desired to dissipate energy to limit an overall excursion of vibrational modes near resonance. This can be particularly useful for acceleration sensors and other systems that rely on consistent vibrational responses across frequency.

Example damping techniques to dissipate energy include use of a tuned mass damper (TMD) to limit the resonant response of an acceleration-based system (e.g., such as a direction-finding hydrophone or underwater acoustic vector sensor). Silicone oil can be included in the TMD to limit movement; however, drawbacks of silicone oil include possible contamination of other parts, as well as a shift in viscosity with temperature. Ultimately, the contamination often interferes with bonding agents for the hydrophone building process, which reduces consistency and overall quality of the product. In addition, there are cost implications, as additional parts and design features, such as seals, are often needed to contain the oil.

Other passive damping solutions include viscoelastic materials, such as foam pads or potting materials. Typically, an end of a cantilever is in direct contact with the viscoelastic material. Pre-compressing the viscoelastic typically increases the damping performance. This approach tends to work well in a stable environment; however, damping properties can vary over a few degrees altering response of the sensor across temperature.

Still other damping options include active compensation schemes, which may be expensive to develop and become more complicated to produce.

What is needed is a damping technique that overcomes such issues.

SUMMARY

In one example, a cantilever assembly is described that comprises a cantilever including an anchor configured to be coupled to a support, a tip, and an arm positioned between the anchor and the tip, a hollow conductive tube positioned at the tip of the cantilever, and a magnet suspended inside the hollow conductive tube with a first spring and a second spring. The first spring and the second spring are positioned at a first end and a second end of the hollow conductive tube respectively, and the magnet is positioned between the first spring and the second spring. The magnet is configured to move coaxially inside the hollow conductive tube as permitted by the first spring and the second spring, and the magnet suspended inside the hollow conductive tube operates as a tuned mass damper (TMD) to limit a resonant response of the cantilever assembly.

In another example, a vector sensor assembly is described that comprises a housing, a printed circuit board in the housing, and a plurality of cantilever assemblies positioned in the housing and coupled to the printed circuit board. Each of the plurality of cantilever assemblies comprises a cantilever including an anchor configured to be coupled to a support, a tip, and an arm positioned between the anchor and the tip, a hollow conductive tube positioned at the tip of the cantilever, and a magnet suspended inside the hollow conductive tube with a first spring and a second spring. The first spring and the second spring are positioned at a first end and a second end of the hollow conductive tube respectively, and the magnet is positioned between the first spring and the second spring. The magnet is configured to move coaxially inside the hollow conductive tube as permitted by the first spring and the second spring, and the magnet suspended inside the hollow conductive tube operates as a tuned mass damper (TMD) to limit a resonant response of the cantilever assembly.

In another example, a method of providing damping for a cantilever assembly is described. The method comprises positioning a hollow conductive tube at a tip of a cantilever, and the cantilever includes an anchor configured to be coupled to a support, the tip, and an arm positioned between the anchor and the tip. The method also comprises suspending a magnet inside the hollow conductive tube with a first spring and a second spring, and positioning the first spring and the second spring at a first end and a second end of the hollow conductive tube respectively. The magnet is positioned between the first spring and the second spring, and the magnet is configured to move coaxially inside the hollow conductive tube as permitted by the first spring and the second spring. The method also comprises operating the magnet suspended inside the hollow conductive tube as a tuned mass damper (TMD) to limit a resonant response of the cantilever assembly.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully hereinafter with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

By the term "about" or "substantially" with reference to amounts or measurement values, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Within examples, techniques are described for using magnetics to create a tuned mass damper (TMD). In one use case, the TMD can be employed to limit a resonant response of an acceleration-based direction-finding hydrophone (i.e., underwater acoustic vector sensor) with essentially no variation due to operating temperature. An acoustic vector sensor design of the hydrophone utilizes a balanced configuration of vertically cantilevered beams oriented orthogonally to provide direction-finding capability, and to operate as the TMDs. A fundamental resonance of each cantilevered beam lies within an acoustic band of interest, which gives rise to a need to dampen a resonance response of the cantilevered beams to provide improved gain and phase consistency as well as to preserve a dynamic range through the sensing chain. The magnetic TMD attenuates dynamic motion of the cantilever beam at resonance, flattening gain and phase response curves and easing signal processing.

It is desirable to achieve a response curve consistent regardless of environment so as to achieve damping performance that is stable across temperature. Damping performance with use of the magnetic TMD can achieve such stability, and is useful for sonobuoys as well as a number of products that require a tuned mechanical response that does not require extensive tuning, calibration, and/or active compensation.

Use of the magnetic TMD does not require other passive damping solutions, such as silicone oil or viscoelastic materials such as foam pads or potting materials. Thus, the magnetic TMD is advantageous for use of less components and a lower cost design.

Figure 1:
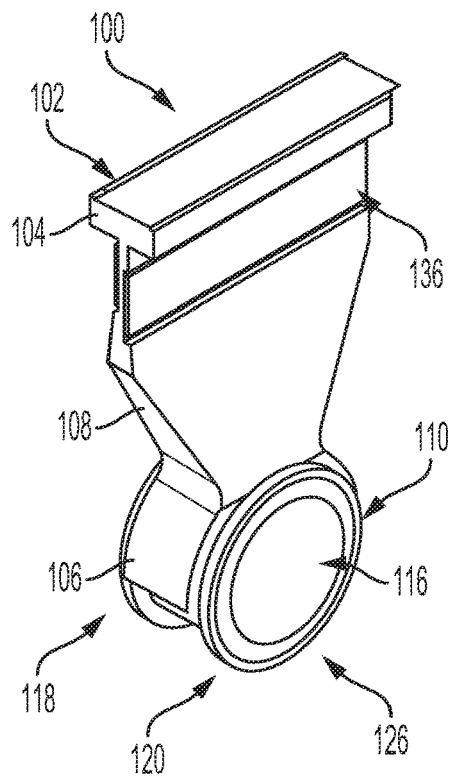
FIG. 1 illustrates a perspective view of an example of a cantilever assembly, according to an example implementation.
Figure 2:
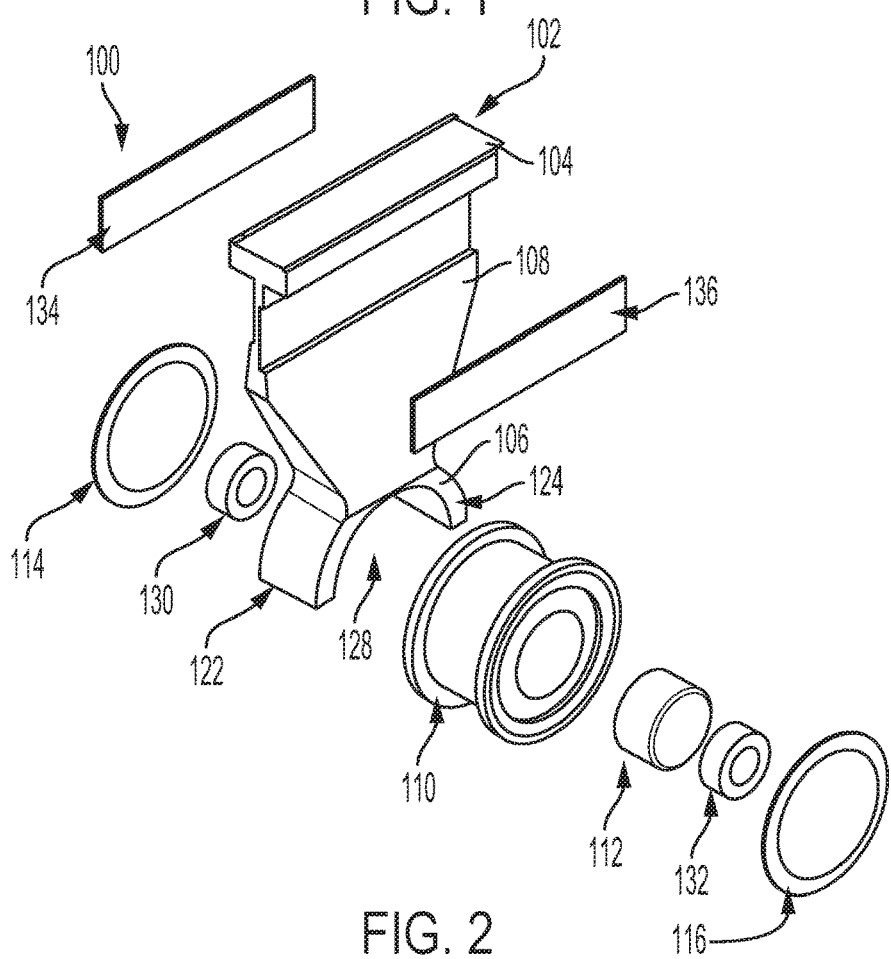
FIG. 2 illustrates an exploded view of the cantilever assembly, according to an example implementation.

Referring now to FIGS. 1-2, FIG. 1 illustrates a perspective view of an example of a cantilever assembly 100, according to an example implementation. FIG. 2 illustrates an exploded view of the cantilever assembly 100, according to an example implementation. The cantilever assembly 100 includes a cantilever 102 including an anchor 104 configured to be coupled to a support 156 (shown in FIG. 8), a tip 106, and an arm 108 positioned between the anchor 104 and the tip 106. The cantilever assembly 100 also includes a hollow conductive tube 110 positioned at the tip 106 of the cantilever 102, and a magnet 112 suspended inside the hollow conductive tube 110 with a first spring 114 and a second spring 116. The first spring 114 and the second spring 116 are positioned at a first end 118 and a second end 120 of the hollow conductive tube 110 respectively, and the magnet 112 is positioned between the first spring 114 and the second spring 116. The magnet 112 is configured to move coaxially inside the hollow conductive tube 110 as permitted by the first spring 114 and the second spring 116, and the magnet 112 suspended inside the hollow conductive tube 110 operates as a tuned mass damper (TMD) to limit a resonant response of the cantilever assembly 100.

The cantilever 102 comprises an integral component and may include steel, aluminum or other materials. The tip 106 of the cantilever 102 includes a first structural support 122 extending partially around a first side of the hollow conductive tube 110, and a second structural support 124 extending partially around a second side of the hollow conductive tube 110. The first structural support 122 and the second structural support 124 extend partially around portions of the hollow conductive tube 110 such that a surface 126 of the hollow conductive tube is exposed, for example. Thus, the tip 106 of the cantilever 102 also includes an opening 128 into which the hollow conductive tube 110 is positioned.

The hollow conductive tube 110 may comprise any conductive materials (e.g., copper) and includes an opening into which the magnet 112 is positioned.

The magnet 112 may be a permanent magnet, such as a Neodymium Iron Boron, for example.

The first spring 114 and the second spring 116 include disc springs in which a spring constant is controlled via internal etching on a surface of the disc. In one example, the magnet 112 is coupled to the first spring 114 and the second spring 116 with an adhesive. In another example, the cantilever assembly 100 includes a first spacer 130 positioned between the first spring 114 and the magnet 112, and a second spacer 132 positioned between the second spring 116 and the magnet 112. The magnet 112 is then coupled to the first spring 114 via the first spacer 130 and to the second spring 116 via the second spacer 132.

The cantilever assembly 100 also includes on the arm 108 of the cantilever 102 a first piezoelectric element 134 positioned on a first side of the arm 108, and a second piezoelectric element 136 positioned on a second side of the arm 108. The second side of the arm 108 is opposite the first side of the arm 108. The first piezoelectric element 134 and the second piezoelectric element 136 are operable as an acoustic sensor.

Figure 3:
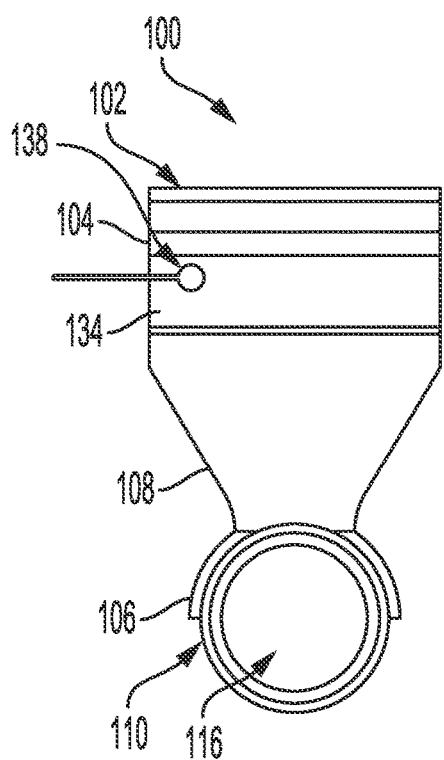
FIG. 3 illustrates a first side view of the cantilever assembly, according to an example implementation.
Figure 4:
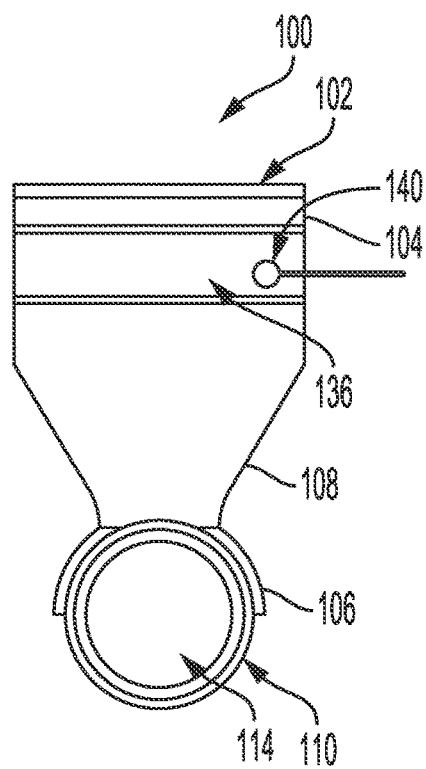
FIG. 4 illustrates a second side view of the cantilever assembly, according to an example implementation.
Figure 5:
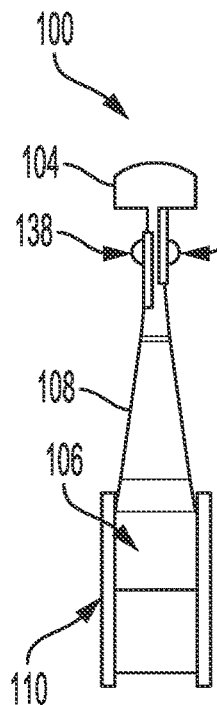
FIG. 5 illustrates an end view of the cantilever assembly, according to an example implementation.
Figure 6:
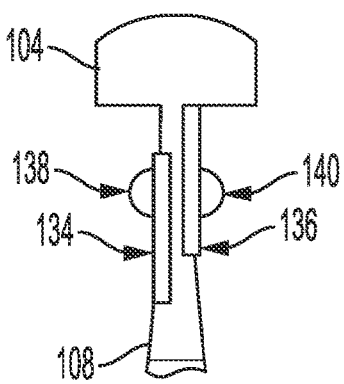
FIG. 6 illustrates a magnified view along an end of a top portion of the cantilever assembly, according to an example implementation.
Figure 7:
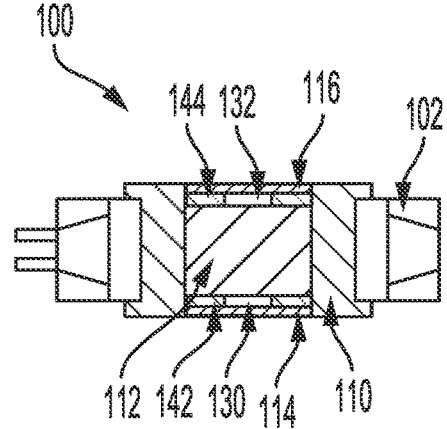
FIG. 7 illustrates a top cross sectional view of the cantilever assembly, according to an example implementation.

FIGS. 3-7 illustrate different views of the cantilever assembly 100. FIG. 3 illustrates a first side view of the cantilever assembly 100, according to an example implementation. FIG. 4 illustrates a second side view of the cantilever assembly 100, according to an example implementation. FIG. 5 illustrates an end view of the cantilever assembly 100, according to an example implementation. FIG. 6 illustrates a magnified view along an end of a top portion of the cantilever assembly 100, according to an example implementation. FIG. 7 illustrates a top cross sectional view of the cantilever assembly 100, according to an example implementation.

FIG. 3 illustrates a side of the cantilever assembly 100 corresponding to the positive (north) polarity of the magnet 112, and FIG. 4 illustrates a side of the cantilever assembly 100 corresponding to the negative (south) polarity of the magnet 112. A first lead 138 is coupled to a positive polarity end of the first piezoelectric element 134, and a second lead 140 is coupled to a negative polarity end of the second piezoelectric element 136. The first lead 138 and the second lead 140 are coupled to a printed circuit board 154 (shown in FIG. 8).

In FIGS. 3 and 4, the side views illustrate that the arm 108 of the cantilever 102 has a width that tapers from the anchor 104 to the tip 106. Thus, the width of the arm 108 decreases along a length toward the tip 106.

In FIG. 5, the end view illustrates that the arm 108 of the cantilever 102 has a thickness that tapers from the tip 106 to the anchor 104. Thus, the thickness of the arm 108 increases along a length toward the tip 106. The tip 106 is thicker than the anchor 104 so as to support the hollow conductive tube 110.

In FIG. 6, the first piezoelectric element 134 and the second piezoelectric element 136 are positioned on a top portion of the arm 108 and on the first side and second side of the arm, respectively. The second piezoelectric element 136 is positioned to be offset from the first piezoelectric element 134 such that the second piezoelectric element 136 is positioned to be closer to the anchor 104 than the first piezoelectric element 134. For performance, the offset of the first piezoelectric element 134 with respect to the second piezoelectric element 136 helps to control higher mode harmonics that are outside of a desired band, so as to increase bandwidth for the cantilever assembly 100.

In FIG. 7, the magnet 112 is shown inside the hollow conductive tube 110 along with the first spacer 130 positioned between the first spring 114 and the magnet 112, and the second spacer 132 positioned between the second spring 116 and the magnet 112. For operation of the cantilever assembly 100, a perpendicular magnetic field is needed to pass through the hollow conductive tube 110 to create an eddy current, and thus, a position of the magnet 112 inside the hollow conductive tube 110 is optimized using the first spacer 130 and the second spacer 132. The first spacer 130 and the second spacer 132 also create a first gap 142 and a second gap 144 inside the hollow conductive tube 110 between the magnet 112 and the first spring 114 and the second spring 116.

The cantilever assembly 100 operates as an acoustic sensor. For example, the cantilever 102 has a resonance of a certain tone, and when acoustic energy impinges upon the cantilever 102, the first piezoelectric element 134 and the second piezoelectric element 136 can collect the energy. To sense resonance in an acoustic or audio band of interest, the cantilever assembly 100 needs to include damping.

In an example operation, the magnet 112 suspended inside the hollow conductive tube 110 operates as a tuned mass damper (TMD) to limit a resonant response of the cantilever assembly 100. The magnet 112 is allowed to move coaxially inside the hollow conductive tube 110 via suspension between the first spring 114 and the second spring 116. As the cantilever 102 swings back and forth, a changing magnetic field produced by motion of the magnet 112 relative to the hollow conductive tube 110 generates eddy currents in the hollow conductive tube 110 (Faraday's law of induction) that produce an electromagnetic force opposing movement of the magnet 112 (Lenz's law). Electromagnetic induction is a phenomenon, in which an electromotive force (emf) is induced in a conductor, when it experiences a changing magnetic field. An emf is induced when either the conductor moves across a steady magnetic field or when the conductor is placed in a changing magnetic field. Due to this induced emf and the conducting path available, induced currents (flow of electrons) are set up in the body of the conductor. These induced currents are in the form of eddy currents that are electrons swirling within the body of the conductor like water swirling in a whirlpool (eddy). The eddy currents swirl in such a way as to create a magnetic field opposing the change in the magnetic field experienced by the conductor in accordance with Lenz's law. Thus, the eddy currents swirl in a plane perpendicular to the magnetic field. These eddy currents interact with the magnetic field to produce a force, which opposes the motion of the moving conductor or object. The damping force increases as the distance of the conductor decreases from the magnet.

The magnet 112 thus acts as a mass of the TMD, so that the electromagnetic force opposing movement of the magnet 112 is a damping force. A magnitude of the electromagnetic force is based on a magnetic field strength, magnet velocity relative to the hollow conductive tube 110, geometry of the hollow conductive tube 110, and conductivity of the hollow conductive tube 110, all of which remain substantially constant across operating temperatures. Since the magnitude of the electromagnetic force is influenced by velocity, at small amplitude displacements, the cantilever assembly 100 has little to no effect on sensitivity allowing for maximum response away from resonance, and maximum damping at or near resonance for a properly matched device.

The damping force is also proportional to the strength of the magnetic field and the induced eddy currents, and hence the velocity of the magnet 112. Thus, the faster the magnet 112 moves the stronger is the damping force. This means that as the magnet 112 slows down, the damping force is reduced, resulting in a smooth stopping motion.

Within examples, the damping mechanism for the cantilever assembly 100 is contained in the cantilever assembly 100. No other parts or fixed points are needed to support a damping mechanism. This is advantageous because the damping is implemented at a lowest assembly level, and provides a single axis assembly flow (which lends itself well to automated approaches), reduced tolerance stack-up/alignment concerns, reduced force coupling between cantilevers (mechanical cross talk), and allows a possibility to test screen the cantilever assembly 100 before it makes it to the upper level assembly, thus preventing rework from occurring later in the assembly process. In addition, using a magnetic TMD approach improves or maintains sensitivity rather than reducing it, which is typically what other damping approaches do. This is because other damping mechanisms usually have to add components and materials not associated with the cantilever assembly 100, which increases weight of the device and decreases coupling to the seawater motion, thereby decreasing sensitivity. The magnetic TMD approach incorporates the damping as a component of the cantilever sprung mass, mitigating sensitivity loss by using the mass for dual purpose. Moreover, a damping coefficient of the cantilever assembly 100 is not dependent upon temperature.

Figure 8:
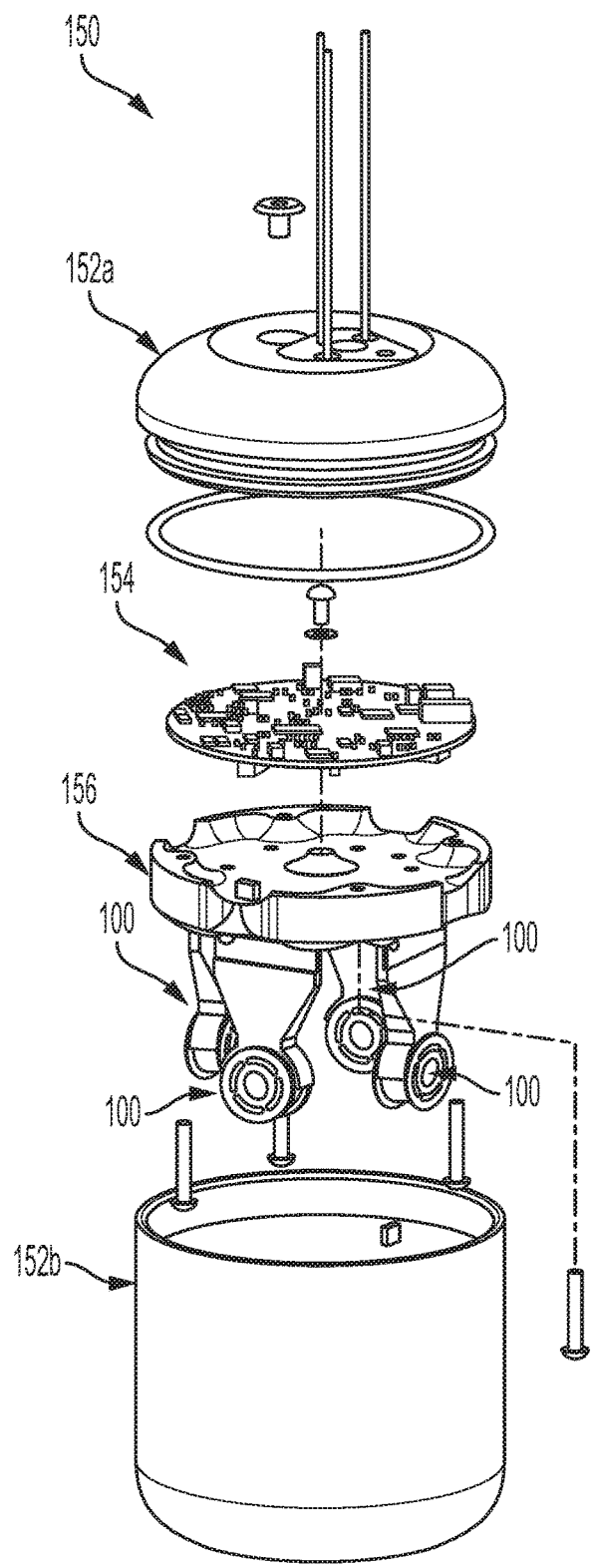
FIG. 8 illustrates an example of a vector sensor assembly, according to an example implementation.

FIG. 8 illustrates an example of a vector sensor assembly 150, according to an example implementation. The vector sensor assembly 150 includes a housing 152a-b (top 152a and bottom 152b), a printed circuit board 154 in the housing 152a-b, and a plurality of cantilever assemblies 100 positioned in the housing 152a-b and coupled to the printed circuit board 154. Each of the plurality of cantilever assemblies 100 includes the cantilever 102 including the anchor 104 configured to be coupled to a support 156, the tip 106, and the arm 108 positioned between the anchor 104 and the tip 106, the hollow conductive tube 110 positioned at the tip 106 of the cantilever 102, and the magnet 112 suspended inside the hollow conductive tube 110 with the first spring 114 and the second spring 116. The first spring 114 and the second spring 116 are positioned at the first end 118 and the second end 120 of the hollow conductive tube 110 respectively, and the magnet 112 is positioned between the first spring 114 and the second spring 116. The magnet 112 is configured to move coaxially inside the hollow conductive tube 110 as permitted by the first spring 114 and the second spring 116, and the magnet 112 suspended inside the hollow conductive tube 110 operates as a tuned mass damper (TMD) to limit a resonant response of the cantilever assembly 100.

The vector sensor assembly 150 is shown to include four of the cantilever assemblies 100 oriented in a box pattern inside of the housing 152a-b and wired to be connected to the printed circuit board 154. The plurality of cantilever assemblies 100 are arranged vertically in the housing 152a-b and oriented orthogonal to each other to provide directional acoustic sensing functionality. The damping of one of the cantilever assemblies 100 has minimal impact on neighboring orthogonal vane(s).

The addition of the magnetic field to the vector sensor assembly 150 is not problematic to other sensor functions. For instance, permanent magnet fields do not prohibit a compass from being properly calibrated. The magnetic materials used induce a significant hard iron offset but no significant soft iron distortion, which is accounted for using standard 3D compass calibration and compensation methods. Additionally, based on lab and field testing, the eddy currents have no measurable impact on the sensor noise floor or the piezoelectric ceramic performance as an acoustic pickup.

The vector sensor assembly 150 can be connected to a bottom of long cable in an ocean collecting audio data and sending the data back to aircraft over radio from surface. The entire device may be referred to as a sonobuoy.

Figure 9:
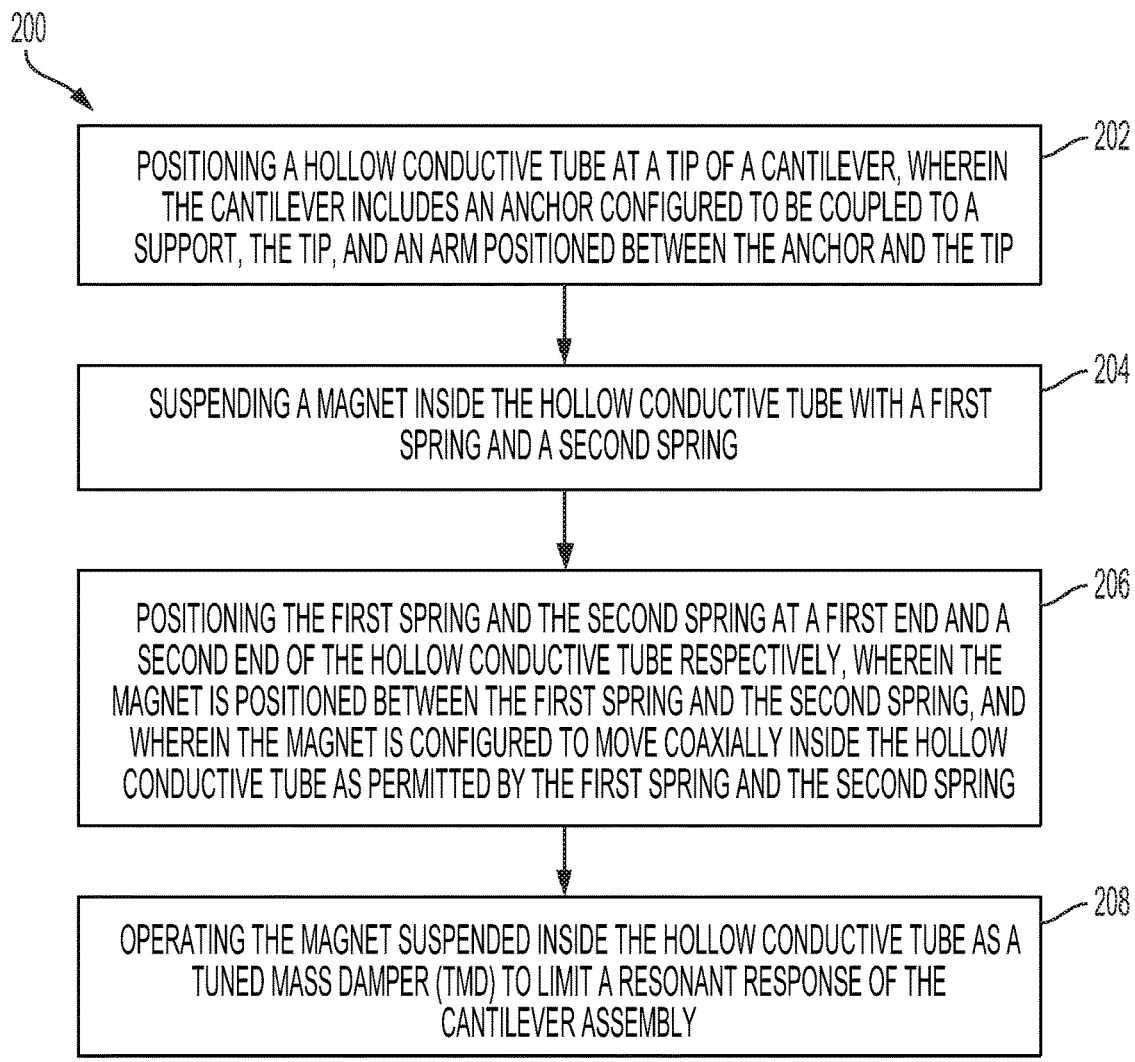
FIG. 9 shows a flowchart of an example of a method of providing damping for a cantilever assembly, according to an example embodiment.

FIG. 9 shows a flowchart of an example of a method 200 of providing damping for a cantilever assembly, according to an example embodiment. Method 200 shown in FIG. 9 presents an embodiment of a method that, for example, could be used with the cantilever assembly 100 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes positioning the hollow conductive tube 110 at the tip 106 of the cantilever 102, and the cantilever 102 includes the anchor 104 configured to be coupled to the support 156, the tip 106, and the arm 108 positioned between the anchor 104 and the tip 106.

At block 204, the method 200 includes suspending the magnet 112 inside the hollow conductive tube 110 with the first spring 114 and the second spring 116.

At block 206, the method 200 includes positioning the first spring 114 and the second spring 116 at the first end 118 and the second end 120 of the hollow conductive tube 110 respectively, and the magnet 112 is positioned between the first spring 114 and the second spring 116, and the magnet 112 is configured to move coaxially inside the hollow conductive tube 110 as permitted by the first spring 114 and the second spring 116.

At block 208, the method 200 includes operating the magnet 112 suspended inside the hollow conductive tube 110 as a tuned mass damper (TMD) to limit a resonant response of the cantilever assembly 100.

Figure 10:
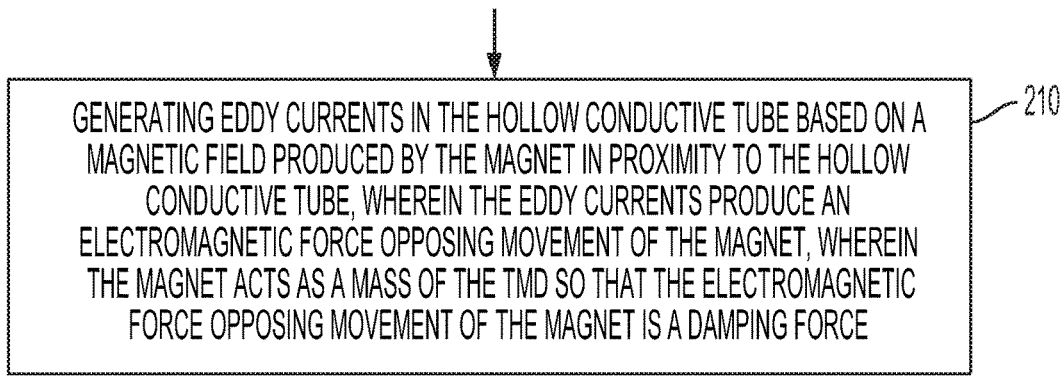
FIG. 10 shows a flowchart of an example method for use with the method shown in FIG. 9, according to an example embodiment.

FIG. 10 shows a flowchart of an example method for use with the method 200, according to an example embodiment. At block 210, functions include generating eddy currents in the hollow conductive tube 110 based on a magnetic field produced by the magnet 112 in proximity to the hollow conductive tube 110, and the eddy currents produce an electromagnetic force opposing movement of the magnet 112. The magnet 112 acts as a mass of the TMD so that the electromagnetic force opposing movement of the magnet is a damping force.

Within examples, the cantilever assembly 100 described herein provides alternate damping techniques to oil or foam damping, which add extra material, complexity and cost. This approach simplifies manufacturing of the miniature sonobuoy sensor and enhances performance.

Although the cantilever assembly 100 has been described with respect to sonobuoy applications, the cantilever assembly 100 has applications to other areas of interest for vibration control.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A cantilever assembly comprising:
   a cantilever including an anchor configured to be coupled to a support, a tip, and an arm positioned between the anchor and the tip;
   a hollow conductive tube positioned at the tip of the cantilever; and
   a magnet suspended inside the hollow conductive tube with a first spring and a second spring, wherein the first spring and the second spring are positioned at a first end and a second end of the hollow conductive tube respectively, and the magnet is positioned between the first spring and the second spring, and wherein the magnet is configured to move coaxially inside the hollow conductive tube as permitted by the first spring and the second spring, wherein the magnet suspended inside the hollow conductive tube operates as a tuned mass damper (TMD) to limit a resonant response of the cantilever assembly,
   wherein the tip of the cantilever comprises:
   a first structural support extending partially around a first side of the hollow conductive tube; and
   a second structural support extending partially around a second side of the hollow conductive tube.

2. The cantilever assembly of claim 1, wherein the first structural support and the second structural support extend partially around portions of the hollow conductive tube such that a surface of the hollow conductive tube is exposed.

3. The cantilever assembly of claim 1, wherein the tip of the cantilever comprises:

an opening into which the hollow conductive tube is positioned.

4. The cantilever assembly of claim 1, wherein the arm of the cantilever has a thickness that tapers from the tip to the anchor.

5. The cantilever assembly of claim 1, wherein the arm of the cantilever has a width that tapers from the anchor to the tip.

6. The cantilever assembly of claim 1, wherein the arm of the cantilever comprises:
a first piezoelectric element positioned on a first side of the arm; and
a second piezoelectric element positioned on a second side of the arm, wherein the second side of the arm is opposite the first side of the arm.

7. The cantilever assembly of claim 6, wherein the first piezoelectric element and the second piezoelectric element are operable as an acoustic sensor.

8. The cantilever assembly of claim 6, wherein the first piezoelectric element and the second piezoelectric element are positioned on a top portion of the arm and on the first side and second side of the arm, respectively, wherein the second piezoelectric element is positioned to be offset from the first piezoelectric element such that the second piezoelectric element is positioned to be closer to the anchor than the first piezoelectric element.

9. The cantilever assembly of claim 1, wherein a changing magnetic field produced by motion of the magnet relative to the hollow conductive tube generates eddy currents in the hollow conductive tube that produce an electromagnetic force opposing movement of the magnet.

10. The cantilever assembly of claim 9, wherein the magnet acts as a mass of the TMD so that the electromagnetic force opposing movement of the magnet is a damping force.

11. The cantilever assembly of claim 9, wherein a magnitude of the electromagnetic force is based on a magnetic field strength, magnet velocity relative to the hollow conductive tube, geometry of the hollow conductive tube, and conductivity of the hollow conductive tube, all of which remain substantially constant across operating temperatures.

12. The cantilever assembly of claim 1, further comprising:
a first spacer positioned between the first spring and the magnet; and
a second spacer positioned between the second spring and the magnet,
wherein the magnet is coupled to the first spring via the first spacer and to the second spring via the second spacer.

13. A vector sensor assembly comprising:
a housing;
a printed circuit board in the housing; and
a plurality of cantilever assemblies positioned in the housing and coupled to the printed circuit board, wherein each of the plurality of cantilever assemblies comprises:
a cantilever including an anchor configured to be coupled to a support, a tip, and an arm positioned between the anchor and the tip;
a hollow conductive tube positioned at the tip of the cantilever; and
a magnet suspended inside the hollow conductive tube with a first spring and a second spring, wherein the first spring and the second spring are positioned at a first end and a second end of the hollow conductive tube respectively, and the magnet is positioned between the first spring and the second spring, and wherein the magnet is configured to move coaxially inside the hollow conductive tube as permitted by the first spring and the second spring, wherein the magnet suspended inside the hollow conductive tube operates as a tuned mass damper (TMD) to limit a resonant response of the cantilever assembly,
wherein the tip of the cantilever comprises:
a first structural support extending partially around a first side of the hollow conductive tube; and
a second structural support extending partially around a second side of the hollow conductive tube.

14. The vector sensor assembly of claim 13, wherein the plurality of cantilever assemblies are arranged vertically in the housing and oriented orthogonal to each other to provide directional acoustic sensing functionality.

15. The vector sensor assembly of claim 13, wherein the arm of the plurality of cantilever assemblies comprises:
a first piezoelectric element positioned on a first side of the arm; and
a second piezoelectric element positioned on a second side of the arm, wherein the second side of the arm is opposite the first side of the arm,
wherein the first piezoelectric element and the second piezoelectric element are operable as an acoustic sensor.

16. The vector sensor assembly of claim 15, wherein the first piezoelectric element and the second piezoelectric element are positioned on a top portion of the arm and on the first side and second side of the arm, respectively, wherein the second piezoelectric element is positioned to be offset from the first piezoelectric element such that the second piezoelectric element is positioned to be closer to the anchor than the first piezoelectric element.

17. A method of providing damping for a cantilever assembly, the method comprising:
positioning a hollow conductive tube at a tip of a cantilever, wherein the cantilever includes an anchor configured to be coupled to a support, the tip, and an arm positioned between the anchor and the tip, wherein the tip of the cantilever comprises a first structural support extending partially around a first side of the hollow conductive tube and a second structural support extending partially around a second side of the hollow conductive tube;
suspending a magnet inside the hollow conductive tube with a first spring and a second spring;
positioning the first spring and the second spring at a first end and a second end of the hollow conductive tube respectively, wherein the magnet is positioned between the first spring and the second spring, and wherein the magnet is configured to move coaxially inside the hollow conductive tube as permitted by the first spring and the second spring; and
operating the magnet suspended inside the hollow conductive tube as a tuned mass damper (TMD) to limit a resonant response of the cantilever assembly.

18. The method of claim 17, further comprising:
generating eddy currents in the hollow conductive tube based on a magnetic field produced by the magnet in proximity to the hollow conductive tube, wherein the eddy currents produce an electromagnetic force opposing movement of the magnet, wherein the magnet acts as a mass of the TMD so that the electromagnetic force opposing movement of the magnet is a damping force.

19. The vector sensor assembly of claim 13, wherein the first structural support and the second structural support extend partially around portions of the hollow conductive tube such that a surface of the hollow conductive tube is exposed.

20. The vector sensor assembly of claim 13, wherein the tip of the cantilever comprises:
   an opening into which the hollow conductive tube is positioned.

* * * * *